United States Patent
Kang et al.

(10) Patent No.: US 9,362,741 B2
(45) Date of Patent: Jun. 7, 2016

(54) APPARATUS AND METHOD FOR VARIABLY CONTROLLING DISCONNECTION OF INTERCONNECTION LINES IN BATTERY SYSTEM

(71) Applicant: LG CHEM, LTD., Seoul (KR)

(72) Inventors: Jung-Soo Kang, Daejeon (KR); Young-Bo Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 646 days.

(21) Appl. No.: 13/851,239

(22) Filed: Mar. 27, 2013

(65) Prior Publication Data

US 2013/0207476 A1 Aug. 15, 2013

Related U.S. Application Data

(63) Continuation of application No. PCT/KR2011/007279, filed on Sep. 30, 2011.

(30) Foreign Application Priority Data

Sep. 30, 2010 (KR) ........................ 10-2010-0095338

(51) Int. Cl.
*H02J 1/00* (2006.01)
*H01M 10/44* (2006.01)
(Continued)

(52) U.S. Cl.
CPC .............. *H02J 1/00* (2013.01); *H01M 10/441* (2013.01); *H01M 10/482* (2013.01); *H01M 10/486* (2013.01); *H01M 2/348* (2013.01); *Y10T 307/696* (2015.04)

(58) Field of Classification Search
CPC ..... H01M 10/441; H01M 10/448; H02J 1/00; Y10T 307/696
USPC ........................................................ 307/85
See application file for complete search history.

(56) References Cited

U.S. PATENT DOCUMENTS 5,744,936 A * 4/1998 Kawakami ........ H01M 10/4207
320/120
6,268,710 B1 7/2001 Koga
(Continued)

FOREIGN PATENT DOCUMENTS

JP 2001-86656 A 3/2001
JP 2002-42901 A 2/2002
(Continued)

OTHER PUBLICATIONS

International Search Report for PCT/KR2011/007279 mailed on May 31, 2012.
(Continued)

*Primary Examiner* — Scott Bauer
(74) *Attorney, Agent, or Firm* — Birch, Stewart, Kolasch & Birch, LLP (57) ABSTRACT

Disclosed are an apparatus and method for variably controlling the disconnection or connection of switch connections between battery units in a large battery system based on the degree of a sensed dangerous external situation to convert the battery system into a small capacity and low voltage state. The apparatus includes: switches provided to interconnection lines between battery assembly units to electrically connect or disconnect the interconnection lines; a switch control module adapted to apply on/off signals to the switches; and a disconnection control module adapted to control the switch control module based on a sensed dangerous level to vary the position and number of the target switches to be opened or closed and the disconnection intervals. According to the apparatus and method, dangerous external situations of a large battery system can be sensed and the disconnection of physical connections between the battery units can be variably controlled.

17 Claims, 8 Drawing Sheets

(51) Int. Cl.
*H01M 10/48* (2006.01)
*H01M 2/34* (2006.01)

(56) References Cited

U.S. PATENT DOCUMENTS

| | | | |
|---|---|---|---|
| 6,430,692 B1 * | 8/2002 | Kimble | G06F 1/263 307/66 |
| 6,731,022 B2 * | 5/2004 | Silverman | H01M 2/20 307/139 |
| 7,535,199 B2 | 5/2009 | Kimura et al. | |
| 7,638,977 B2 | 12/2009 | Park | |
| 7,723,954 B2 * | 5/2010 | Frucht | H02J 7/0024 320/116 |
| 7,763,993 B2 * | 7/2010 | Groff | H02J 7/0024 307/66 |
| 2002/0170595 A1 * | 11/2002 | Oliver | G05B 9/02 137/38 |

FOREIGN PATENT DOCUMENTS

| | | |
|---|---|---|
| JP | 2002-142370 A | 5/2002 |
| JP | 2010-130738 A | 6/2010 |
| KR | 10-2003-0021666 A | 3/2003 |
| KR | 10-2006-0059680 A | 6/2006 |
| KR | 10-2006-0094897 A | 8/2006 |
| KR | 10-0834009 B1 | 6/2008 |

OTHER PUBLICATIONS

Written Opinion of the International Searching Authority for PCT/KR2011/007279 mailed on May 31, 2012 (Korean).

* cited by examiner

FIG. 8

APPARATUS AND METHOD FOR VARIABLY CONTROLLING DISCONNECTION OF INTERCONNECTION LINES IN BATTERY SYSTEM

CROSS-REFERENCE TO RELATED APPLICATION

The present application is a continuation of International Application No. PCT/KR2011/007279 filed on Sep. 30, 2011, which claims priority to Korean Patent Application No. 10-2010-0095338 filed in the Republic of Korea on Sep. 30, 2010, the disclosures of which are incorporated herein by reference.

TECHNICAL FIELD

The present disclosure relates to an apparatus and method for variably controlling the disconnection of physical connections between individual battery units in a battery system based on a sensed dangerous external situation to convert the battery system into a stable state of small capacity and low voltage.

BACKGROUND ART

As-built electrical grids supply power based on an expected amount of power that will be used by individual power consumers. However, with the different amount of power consumption depending on season and time and the increase in power consumers, it is not easy to supply an optimal amount of power.

Thus, smart grid systems or micro grid systems have been introduced in which idle power is stored locally in existing electrical grids and is supplied in response to an excess demand for power. Smart grid systems (or micro grid systems) are intelligent electrical grid systems developed by grafting information communication technologies onto power production, transmission and consumption processes to enhance the efficiency of power use through the interaction between power supply and consumption.

In, a power storage system employed in a smart grid or micro grid, one or more large battery systems are installed to control the storage and supply of power. Each of the large battery system includes, for example, one or more battery units selected from cells as the smallest units for power storage and supply, modules as assemblies of a plurality of cells, battery packs as assemblies of a plurality of modules, systems as assemblies of battery packs, and plants as assemblies of a plurality of systems. Due to this construction, the large battery systems can store and supply power of large capacity and high voltage with increasing physical connections between the battery units, such as cells, modules, battery packs and systems.

As described above, generally, the capacity and voltage of power from large battery systems can be controlled by increasing or decreasing the physical connections between the battery units. However, the capacity and voltage of large battery systems are increased to keep pace with the demand for power which increases with the passage of time after initial installation. Accordingly, high stability of large battery systems is needed. However, larger battery systems tend to face greater danger when exposed to natural disasters (e.g., earthquakes, floods and typhoons) and other accidents (e.g., fire and electrical short).

For example, minor problems occurring in some battery units of battery systems may also affect other surrounding battery units, which may lead to major accidents, such as electric shock, fire and explosion.

Therefore, there is a need for a technology that can individually and locally control connection and disconnection between battery units in battery systems as needed to switch between a high capacity and voltage state and a low capacity and voltage state.

DISCLOSURE

Technical Problem

The present disclosure is designed to solve the problems of the prior art, and therefore it is an object of the present disclosure to provide an apparatus and method for variably controlling the disconnection of physical connections between individual battery units in a battery system to convert the battery system into a small capacity and low voltage state.

It is another object of the present disclosure to provide an apparatus and method for variably controlling the disconnection of interconnection lines manually by a manager or automatically by sensors adapted to sense dangerous external situations.

Technical Solution

According to an aspect of the present disclosure, there is provided an apparatus for variably controlling the disconnection of physical connections between battery assembly units. The apparatus includes: switches provided to interconnection lines between battery assembly units to electrically connect or disconnect the interconnection lines; a switch control module adapted to apply on/off signals to the switches; and a disconnection control module adapted to control the switch control module based on a sensed dangerous level to vary the position and number of the target switches to be opened or closed and the disconnection intervals.

The battery assembly units may be selected from battery cells adapted to receive and store external power and supply the stored power to the outside, battery modules corresponding to assemblies of a plurality of battery cells, battery packs corresponding to assemblies of a plurality of battery modules, battery systems corresponding to assemblies of a plurality of battery packs, battery plants corresponding to assemblies of a plurality of battery systems, and combinations thereof.

The apparatus may further include a sensor module adapted to sense current situations in real time and to transmit the sensed data to the disconnection control module.

The sensor module may be placed inside or outside a structure of the battery assembly units or at a location remote from the structure to sense dangerous situations including one of temperature, humidity, electrical short, flood and earthquake, and to wiredly or wirelessly transmit information about the sensed dangerous situations to the disconnection control module.

The disconnection control module may output variable disconnection or connection control signals to the switch control module, and the control signals may include identification information about at least one target switch to be opened or closed.

Preferably, the disconnection control module shortens the disconnection intervals of the battery assembly units the more a disconnection level is determined as a dangerous situation. The disconnection control module receives a manual command from a manager or a command from an external network and transmits a connection or disconnection command corresponding to the received command to the switch control module.

The disconnection control module includes at least one function selected from: if the disconnection control module is connected to an input/output interface connected to screen output means and data input means, a function of receiving a manager's manual input from the data input means through the input/output interface and transmitting a connection and disconnection command corresponding to the manager's manual input to the switch control module; and a function of receiving a connection or disconnection command from a central control station through communication means, to which the disconnection control module is connected, in a wired or wireless manner and transmitting the received command to the switch control module.

More preferably, the disconnection control module may send: if a flood is sensed, a command to disconnect battery cells in order to prevent electric shock; if a dangerous situation is sensed but there is no problem in power supply, a command to disconnect some parallel connections in order to sequentially replace with and connect to disconnected battery constituent modules; if a worker enters a battery system to maintain or repair the battery constituent modules, a command to disconnect interconnection lines to reduce the voltage of the battery system to a level equal to or lower than an allowable voltage for worker's safety by a manager's manual input; if sensed data for gate opening is received from the sensor module in association with a gate of a battery system structure, a command to automatically disconnect interconnection lines to reduce the voltage of the battery system to a level equal to or lower than an allowable voltage for worker's safety; or a command to disconnect some parallel connections in order to utilize the disconnected battery units as spare batteries in a battery system.

According to another aspect of the present disclosure, there is provided a battery assembly including the variable disconnection control apparatus and battery assembly units wherein the apparatus variably controls the disconnection of the battery assembly units and any combination of the battery assembly units.

According to yet another aspect of the present disclosure, there is provided a method for variably controlling the disconnection of physical connections between battery assembly units in a battery system by using the variable disconnection control apparatus. The method includes (S11) sensing, by the sensor module, a current situation and transmitting data about the sensed situation to the disconnection control module, (S12) receiving, by the disconnection control module, the sensed data about the current situation from the sensor module, judging a dangerous situation based on the received data, and determining a disconnection level based on the judged situation, (S13) transmitting, by the disconnection control module, a disconnection command to the switch control module if the determined disconnection level indicates disconnection of the previously connected switch control module, (S14) receiving, by the switch control module, the disconnection command and disconnecting physical connections of the target switches, (S15) transmitting, by the disconnection control module, a connection command to the switch control module if the determined disconnection level indicates connection of the previously disconnected switch control module, after operation (S12), and (S16) receiving, by the switch control module, the connection command and connecting physical connections of the target switches.

Advantageous Effects

The apparatus of the present disclosure senses dangerous situations, such as electric shock and explosion, in the event of flood, fire, etc., and variably controls the disconnection and connection of physical interconnection lines between battery units to stabilize a large battery system into a small capacity and low voltage state.

In addition, the apparatus of the present disclosure controls disconnection and connection in response to power supply and demand situations depending on season and time, enabling variable power supply and demand control.

Furthermore, the apparatus of the present disclosure variably controls the disconnection and connection of interconnection lines in a battery system to allow a worker to maintain and repair the battery system in a safe state of small capacity and low voltage.

DESCRIPTION OF DRAWINGS

The accompanying drawings illustrate preferred embodiments of the invention and, together with the following disclosure, serve to provide further understanding of the technical spirit of the invention. However, the present invention is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein are provided for illustrative purposes only and are not intended to limit the technical scope of the present disclosure. As such, it should be understood that other equivalents and modifications could be made thereto at the time of filing the present application.

<1. Apparatus>

Figure 1:
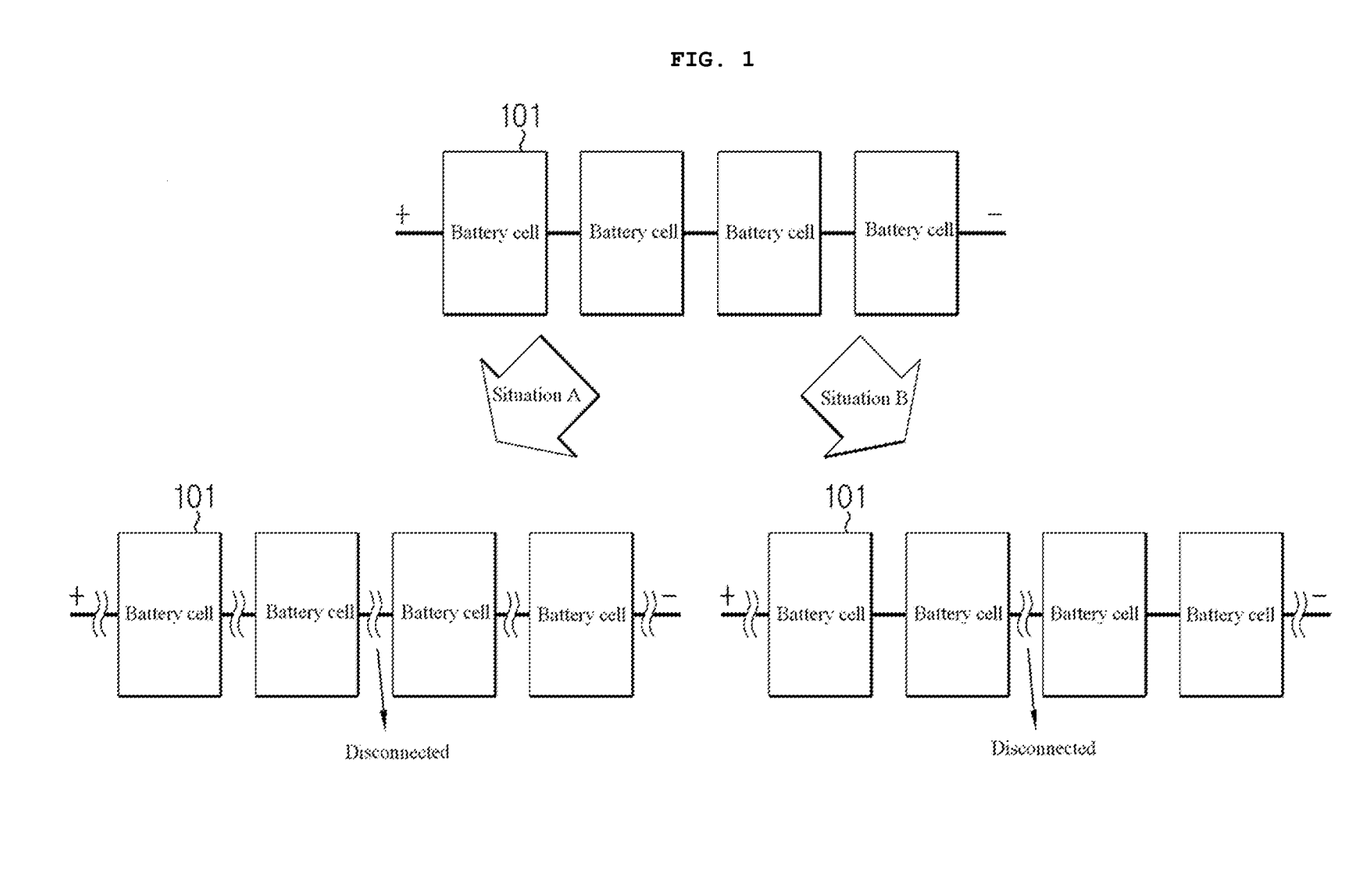
FIGS. 1 and 2 are conceptual diagrams illustrating variable disconnections of interconnection lines in a battery system in different situations according to an embodiment of the present disclosure.
Figure 2:
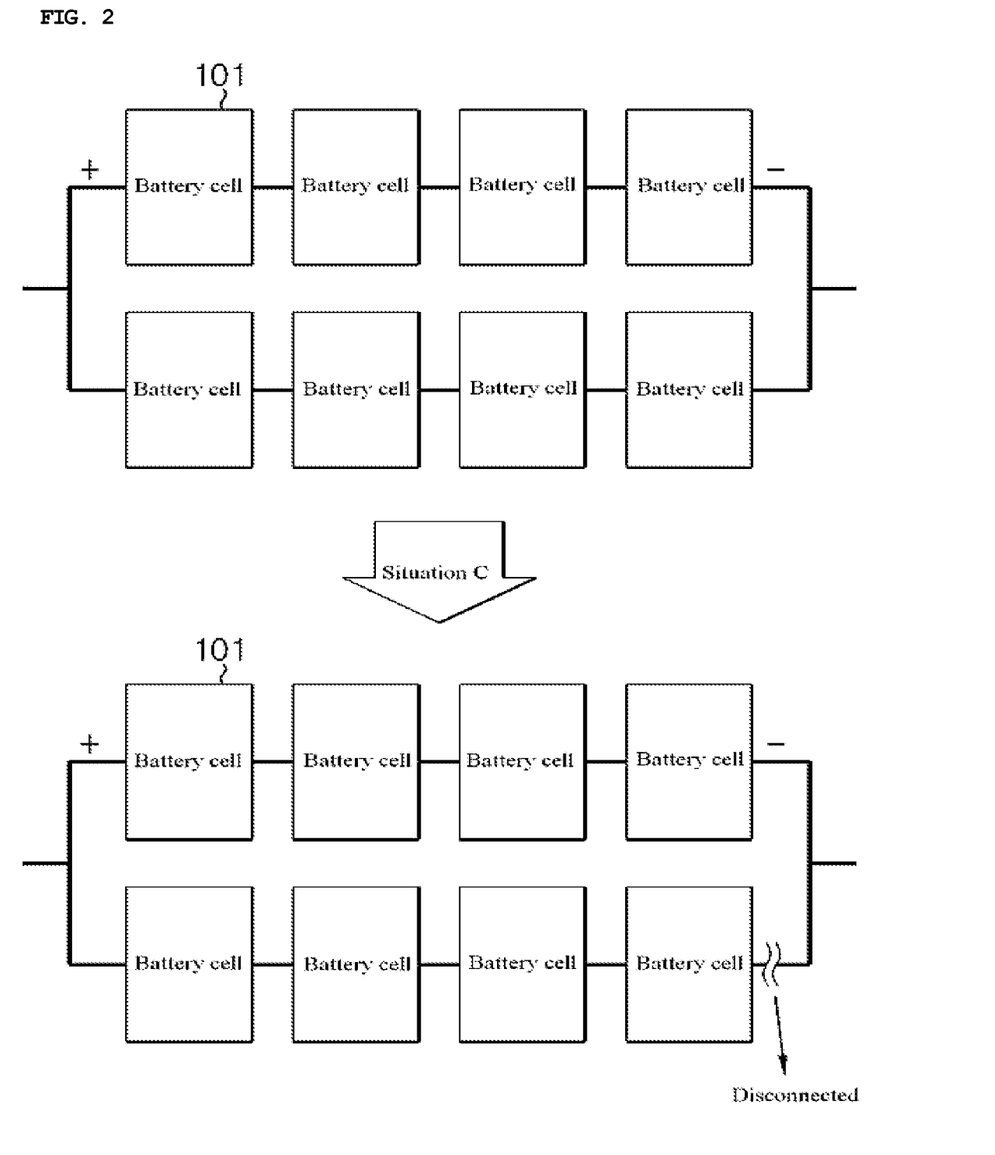

FIGS. 1 and 2 illustrate technological concepts of an apparatus for variably controlling the disconnection of interconnection lines in a battery system in different situations according to an embodiment of the present disclosure.

Battery cells 101 are the smallest units for power storage and supply in a large battery system. The battery cells 101 may be connected to each other in series or parallel to supply large capacity and high voltage power.

The variable disconnection control apparatus of the present disclosure senses an emergency situation, such as earthquake, flood or fire, and variably disconnects interconnection lines between the battery cells 101 in the large battery system if the sensed situation is determined to be dangerous, to convert the battery system into a state of small capacity and low voltage so that disastrous accidents, such as electric shock and explosion, can be avoided. In addition, the variable disconnection control apparatus of the present disclosure can variably adjust the disconnection intervals between the battery cells 101 as needed, for example, when the large battery system needs maintenance and repair and when some battery units enter an idle state.

Referring first to FIG. 1, the variable disconnection control apparatus disconnects interconnection lines between the individual battery cells 101 to stabilize the battery system ("situation A") and disconnects interconnection lines between battery cell groups, each of which consists of two battery cells 101, to stabilize the battery system ("situation B"). The battery system is converted into a more stable state in "situation A" because of shorter disconnection intervals in "situation A" than those in "situation B."

Referring next to FIG. 2, contrary to the disconnections of the serial interconnection lines in "situation A" and "situation B," the variable disconnection control apparatus disconnects an interconnection line between grouped battery cells 101, which are connected in parallel, to stabilize the battery system ("situation C"). In "situation C" in which a total of eight battery cells 101 are fully charged and one of the interconnection lines is disconnected, the four upper battery cells 101 are currently in use and the other four lower battery cells 101 are kept in reserve, which may be used as new sources for power supply after the disconnected interconnection line is recovered.

Figure 3:
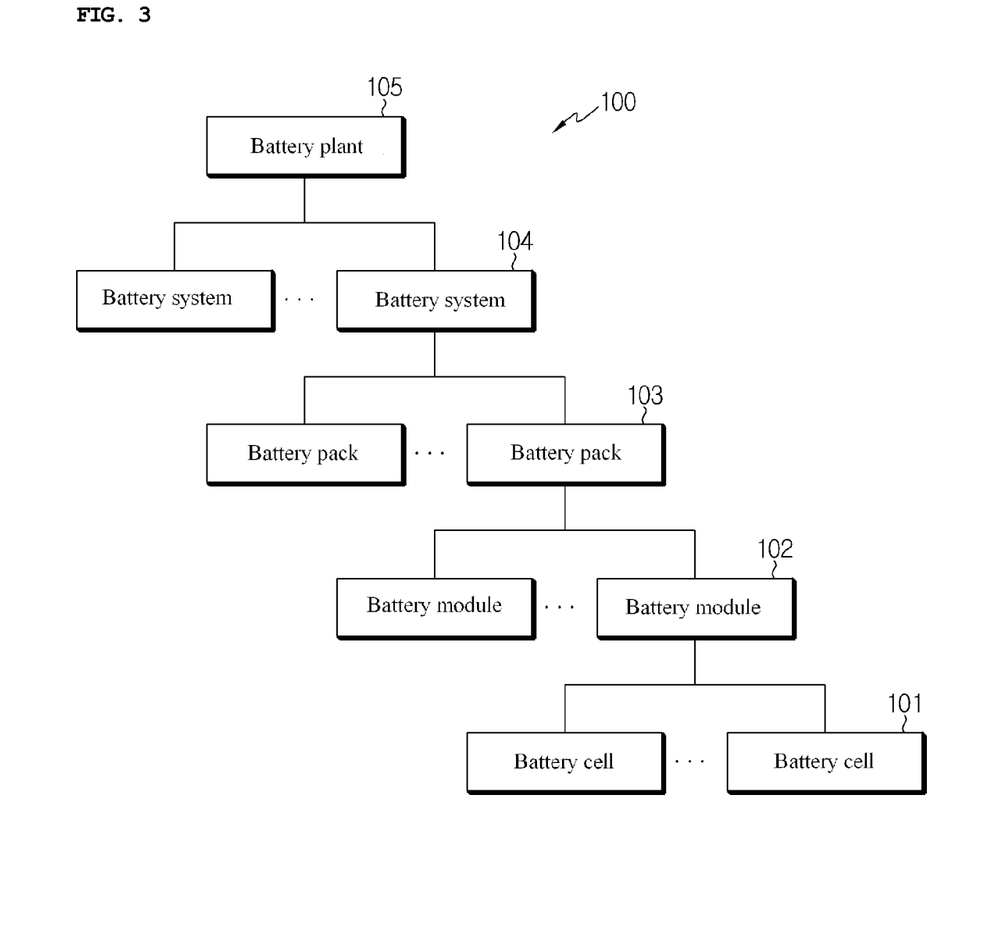
FIG. 3 is a conceptual diagram illustrating battery assembly units according to an embodiment of the present disclosure.

FIG. 3 is a conceptual diagram hierarchically showing battery assembly units 100 according to an embodiment of the present disclosure.

The battery assembly units 100 are divided into the internal constituent battery units and include battery cells 101 as minimum units. Each of the battery cells includes an anode, a cathode and a separator and is the smallest unit cell for power storage and supply. The battery cells 101 are interconnected and assembled to constitute a battery module 102. A plurality of battery modules 102 are interconnected and assembled to constitute a battery pack 103. A plurality of battery packs 103 are interconnected and assembled to constitute a battery system 104. The individual battery assembly units and any combination thereof constitute a battery assembly.

The battery system 104 corresponds to a large battery system to which the present disclosure is applied and is the smallest unit that can be installed in a smart grid (or a micro grid) area. Further, the plural battery systems 104 are interconnected to constitute a battery plant 105. The battery plant 105 is a power source that possesses the largest capacity and highest voltage.

The apparatus of the present disclosure variably disconnects the subordinate units with respect to the battery cells 101, the battery modules 102, the battery packs 103, the battery systems 104, the battery plants 105 and combinations thereof as the battery assembly units 100 to achieve stability of the large battery system.

Figure 6:
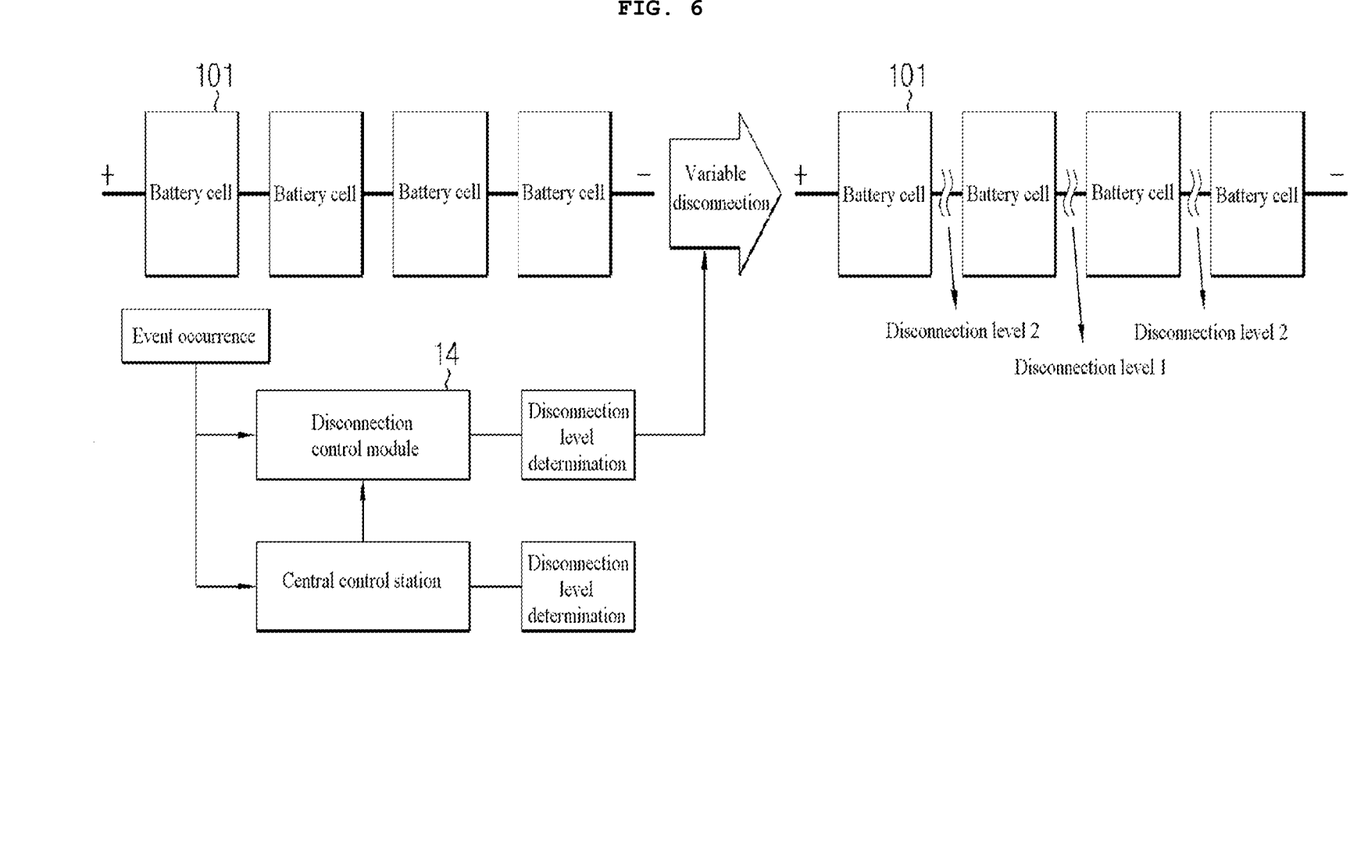
FIG. 6 is a diagram illustrating the operation of a disconnection control module according to an embodiment of the present disclosure.

For convenience of explanation, FIGS. 1, 2 and 6 illustrate the battery cells 101 as units for battery disconnection. However, it should be understood that, in addition to the battery cells 101, the battery modules 102, the battery packs 103, the battery systems 104 and the battery plants 105 corresponding to the battery assembly units 100 may be units for actual battery disconnection.

Figure 4:
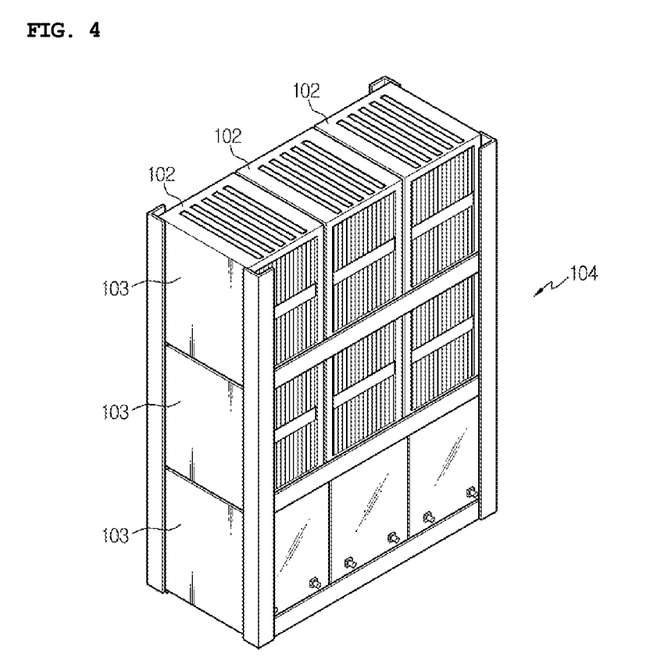
FIG. 4 is an exemplary view illustrating a battery system according to an embodiment of the present disclosure.

FIG. 4 illustrates a battery system 104 according to an embodiment of the present disclosure.

The battery system 104 has a structure in which a plurality of battery units are accommodated in a housing device and are connected to each other in parallel or series. As illustrated in this figure, the battery system 104 includes three layers of battery packs 103, each layer including three battery modules 102 connected to each other. This structure is provided for illustrative purpose only and the battery system 104 is not limited thereto.

Figure 5:
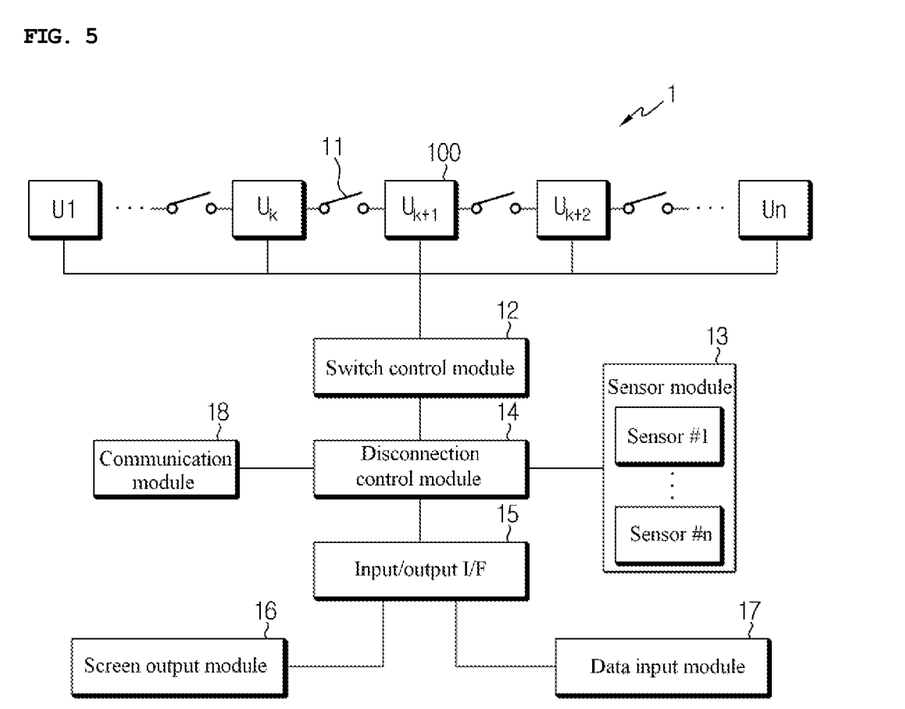
FIG. 5 is a schematic block diagram illustrating the constitution of a variable disconnection control apparatus according to an embodiment of the present disclosure.

FIG. 5 schematically illustrates the constitution of a variable disconnection control apparatus 1 according to an embodiment of the present disclosure.

The apparatus 1 includes a plurality of switches 11, a switch control module 12 and a disconnection control module 14.

The switches 11 are provided to interconnection lines connecting the battery assembly units 100. Specifically, the switches 11 are selectively provided to interconnection lines to be variably connected and disconnected. The switches 11 may be those known to control the electrical connection of interconnection lines, such as semiconductor switches or mechanical relay switches.

The battery assembly units 100 may be selected from the group consisting of battery cells 101, the battery modules 102, the battery packs 103, the battery systems 104, the battery plants 105 and combinations thereof. Accordingly, the switches 11 may be arranged at a predetermined cycle between the battery cells 101, between the battery modules 102, between the battery packs 103, between the battery systems 104, and between the battery plants 105. The term "cycle" as used herein means intervals between the positions where the switches 11 are provided. For example, if the cycle is 3, the switches 11 are arranged at every three battery assembly units 100. The cycle may be variably controlled as needed depending on such factors as stability and charge capacity.

The switch control module 12 receives on/off operation control signals of the switches 11 from the disconnection control module 14 and applies the on/off signals to the switches 11 to electrically disconnect or connect the interconnection lines where the switches 11 are provided. The switch control module 12 may be realized using a typical analog circuit, such as an analog front end circuit, but is not limited thereto.

The disconnection control module 14 determines a disconnection level, transmits a disconnection command to the switch control module 12 based on the determined disconnection level, and variably controls the disconnection depending on a situation level. The disconnection command includes identification information about the target switches 11 to be opened or closed and is information relating to the application of connection or disconnection signals of the target switches 11 to the switch control module 12.

Preferably, the variable disconnection control apparatus 1 further includes a sensor module 13 consisting of a plurality of sensors. The sensor module 13 senses dangerous situations including temperature, humidity, electrical short, flood, etc., and transmits the sensed data to the disconnection control module 14 in real time. Also, the sensor module 13 may be provided at a gate of the battery system structure to transmit information about the open or closed states of the gate to the disconnection control module 14. The sensor module 13 may be provided in plurality. In this case, there is no restriction on the number and position of the sensor modules 13. It would, of course, be possible to provide the sensor modules 13 inside and at one or more locations remote from the battery system. Data transmission between the sensor module 13 and the disconnection control module 14 is possible through wired or wireless communication.

The disconnection control module 14 may also receive a manual input from a manager to control opening or closing operations of the switches 11. For the manager's manual control, the disconnection control module 14 is connected to an input/output I/F 15, which is connected to screen output means 16 and data input means 17. The manager may input a disconnection command through the data input means 17 (for example, a keyboard) as needed while monitoring battery operation information, such as sensor values of the sensor module 13 and battery operation status, through the screen output means 16 (for example, a monitor).

More preferably, the disconnection control module 14 receives a disconnection command from an external terminal through a network to control opening or closing operations of the switch 11. For the external network control, the disconnection control module 14 is connected to a wired or wireless communication module 18 and receives a disconnection command from the wired or wireless communication module 18.

FIG. 6 explains the operation of the disconnection control module 14 according to an embodiment of the present disclosure.

The disconnection control module 14 controls the disconnection and connection of interconnection lines depending on the occurrence of events, such as operation strategies of the apparatus 1, degree of internal/external dangers, and system maintenance and repair.

Preferably, the disconnection control module 14 determines a disconnection level based on the occurrence of an event sensed by the sensor module 13 and sends a disconnection or connection command to the switch control module 12.

Furthermore, the disconnection control module 14 may receive a manual input from a manager and send a connection or disconnection command corresponding to the manual input to the switch control module 12 (local command). Alternatively, the disconnection control module 14 may receive a connection and disconnection command from a remote central control station through a wired or wireless network and transmit the command to the switch control module 12 (remote command). For reference, the wired or wireless network includes all types of communication networks capable of data communication using various protocols, for example, mobile communication networks, wired/wireless public networks, such as the Internet, and private networks.

The disconnection command includes identification information about the target switches 11 to be closed based on the disconnection level. As the situation is determined to be more dangerous, the disconnection intervals of the battery assembly units 100 are more shortened. As explained In FIG. 1, the battery system is in a more stable state of smaller capacity and lower voltage in "situation A" because of the shorter disconnection intervals in "situation A" than those in "situation B."

In addition to this, the disconnection control module 14 may send different disconnection commands depending on the following various situations. In the case where a flood is sensed, a disconnection command is sent to the battery cells 101 as the smallest units in order to prevent electric shock. In the case where a dangerous situation is sensed but there is no problem in continuous use of the battery, a disconnection command is sent to disconnect some parallel connections, to use the other connected battery units only, and to sequentially replace with disconnected batteries to connect and recover the disconnections. A disconnection command to disconnect some parallel connections may also be sent to utilize the disconnected batteries as spare batteries in the battery system (see FIG. 2). Further, in the case where a worker enters the battery system to maintain or repair the battery assembly units 100, a disconnection command may be sent to reduce the voltage of the battery system to a level (for example, 30 volts or less) required to secure the worker's safety, or a disconnection command may be sent to automatically convert the voltage of the battery system to a level equal to or lower than an allowable safety level when sensed data for gate opening is received from the sensor module in association with a gate of the battery system structure.

Figure 7:
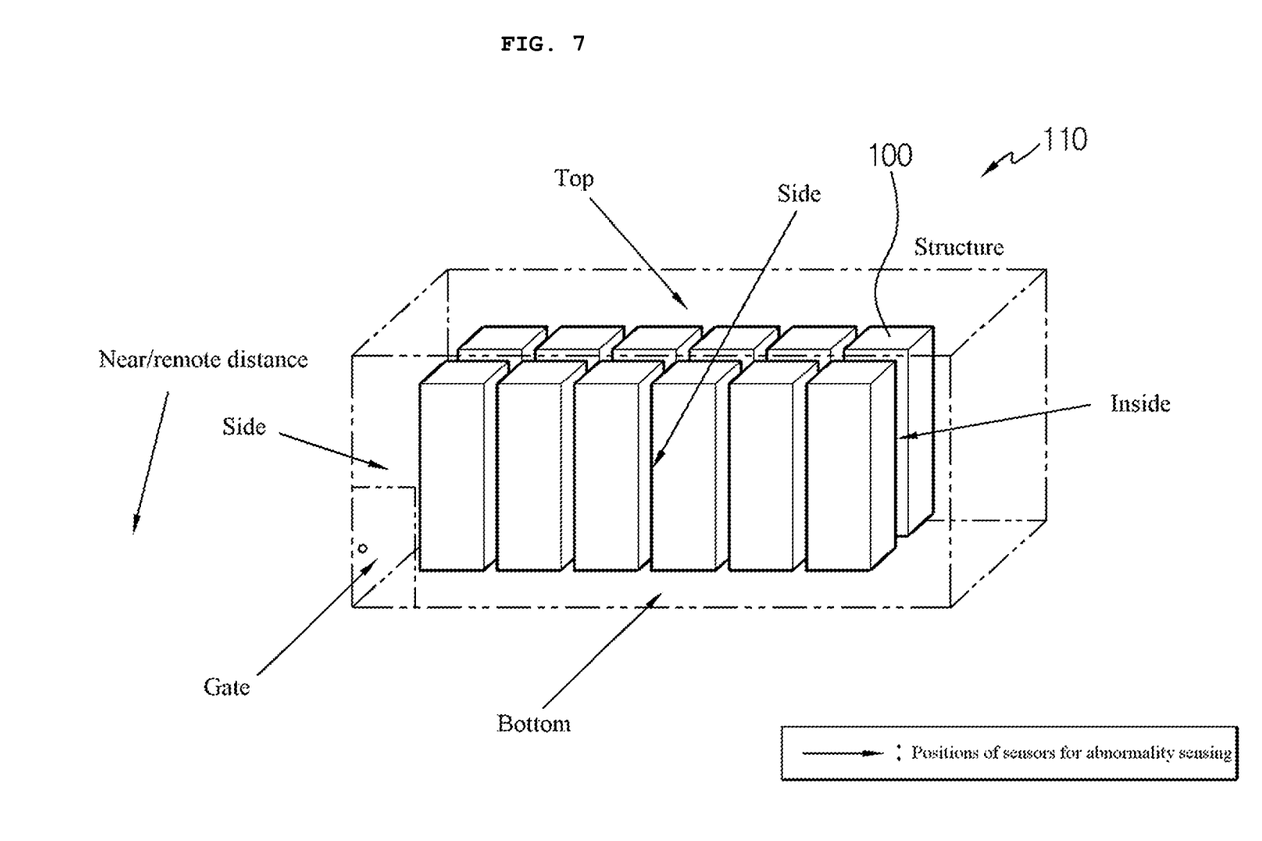
FIG. 7 is a conceptual diagram illustrating the implementation of a sensor module according to an embodiment of the present disclosure.

FIG. 7 is a conceptual diagram illustrating the implementation of the sensor module 13 according to an embodiment of the present disclosure.

Referring to this figure, the sensor module 13 may be directly provided in a battery assembly 110. The battery assembly 110 is a concept including a battery system that is controlled by the apparatus of the present disclosure. The battery assembly 110 may be further extended to a concept including a structure where a plurality of battery assembly units 100 are located.

The sensor module 13 may be provided in plurality. In this case, the sensor modules 13 may be placed in any locations suitable for sensing dangerous situations. For example, the sensor modules 13 may be placed on the inner and outer surfaces of the structure and at a gate of the structure as well as in the battery. The sensor module 13 senses dangerous situations, such as temperature, humidity, electrical short, flood and earthquake, and transmits the sensed data to the disconnection control module 14. Further, a gate sensor for opening/closing detection may be provided to the gate through which a worker enters and exits. If the gate is opened, the disconnection control module 14 may perform a disconnection operation to reduce the voltage of the battery system to a stable level (for example, 30 volts or below) after receiving data informing the open state from the gate sensor.

The battery assembly 110 includes a battery plant as an assembly of a plurality of battery systems. The battery plant is constructed in a space where the battery systems can be protected from external environments. Preferably, the battery assembly 110 is further furnished with an air conditioner for maintaining the temperature and humidity of the battery plant at proper levels, a fire extinguisher, etc. In addition, it is preferred to provide the battery plant with the disconnection control module 14 for performing charge/discharge control operations of the respective battery systems constituting the battery plant, screen monitoring, various protection operations, communication with the outside, and variable disconnection operations.

The functions and operations of the individual elements constituting the apparatus for variable disconnection control in a large battery system will be described in detail in the following method section.

<2. Method>

A method for variable disconnection control in a battery system according to an embodiment of the present disclosure is preferably realized using the variable disconnection control apparatus described above.

Figure 8:
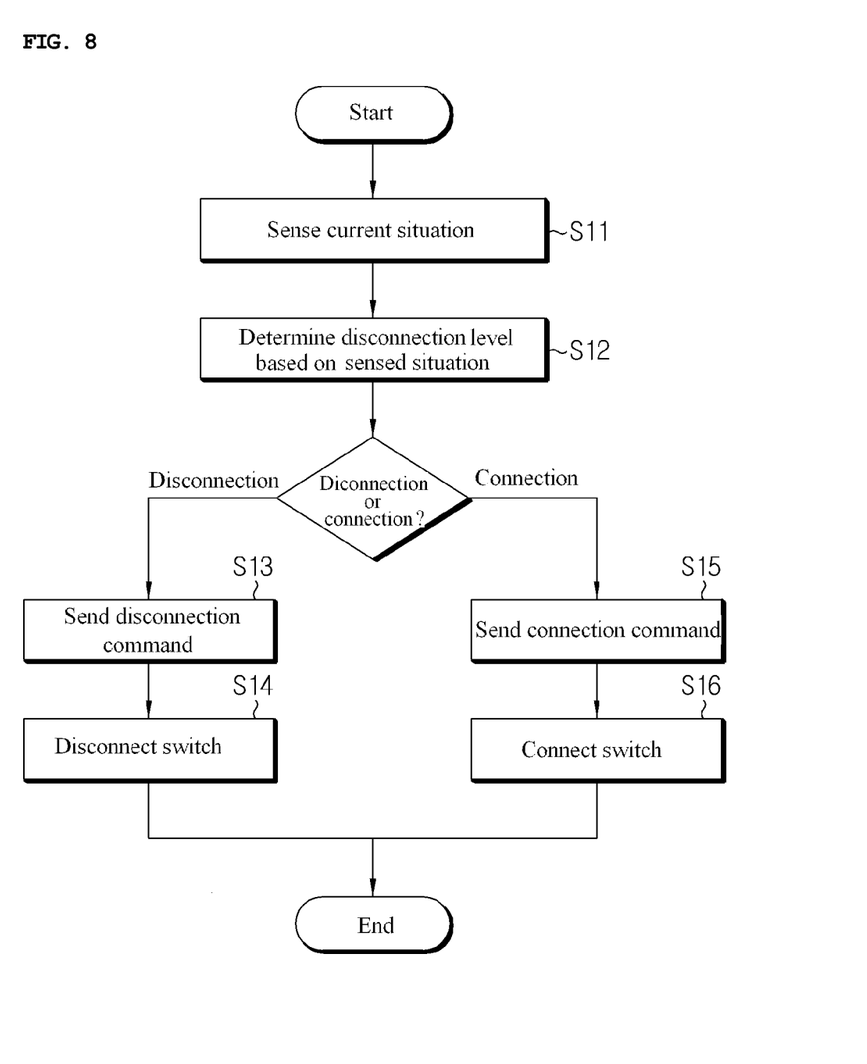
FIG. 8 is a flowchart illustrating a variable disconnection control method according to an embodiment of the present disclosure.

FIG. 8 is a flowchart illustrating the variable disconnection control method.

In the battery system, power storage and supply of the individual battery assembly units 100 are controlled and monitored. The control and monitoring operations may be performed by a manager's manual input and a command transmitted from a central control station through a wired/wireless network as well as by an automated operation strategy. Explanations of the battery assembly units 100 have been already given with reference to FIGS. 3 and 4.

In the course of power supply and demand operations in the battery system, the sensor module 13 of the variable disconnection control apparatus according to the present disclosure transmits sensed data about dangerous situations including one of temperature, humidity, electrical short, flood and earthquake, open/closed states of a gate, etc. to the disconnection control module 14 (S11). The sensor module 13 may consist of a plurality of sensors placed at different locations and transmits the sensed data to the disconnection control module 14 through wired/wireless communication.

The disconnection control module 14 receives the sensed data from the sensor module 13 in real time or every preset period of time, judges a dangerous situation based on the received data, and determines a disconnection level based on the judged situation (S12). The disconnection level is information that determines disconnection and connection commands including information about which switches 11 are controlled as targets, whether or not to disconnect or connect, disconnection intervals, etc. As the situation is determined to be dangerous, disconnection control of the battery cell units 101 as the smallest units by the switches 11 occurs and the disconnection intervals of the battery cell units 101 are shortened.

If the disconnection level corresponds to a disconnection command, the disconnection control module 14 transmits the disconnection command to the switch control module 12 and the switch control module 12 receives the disconnection command from the disconnection control module 14 (S13). Then, the switch control module 12 applies disconnection signals (switch off) to target switches 11, and the target switches 11 disconnect corresponding interconnection lines (S14).

If the disconnection level corresponds to a connection command, the disconnection control module 14 transmits the connection command to the switch control module 12 and the switch control module 12 receives the connection command from the disconnection control module (S15). Then, the switch control module 12 applies connection signals (switch on) to target switches 11, and the switches 11 connect corresponding interconnection lines to each other (S16). After the connection, the battery system returns to its original state prior to disconnection.

The disconnection command and the connection command can be transmitted to each battery unit of the battery assembly units 100 illustrated in FIG. 3. For example, the capacity and voltage of power can be more precisely controlled when the command is sent to the battery cell units 101 rather than to the battery system units 104. Further, a more stable state of small capacity and low voltage units can be obtained as the disconnection intervals become shorter.

Meanwhile, the disconnection control module 14 can be automatically controlled depending on a disconnection level of data about external situations sensed by the sensor module 13 and can control the disconnection and connection of the switch control module 12 after receiving a manual input from a manager. Further, the disconnection control module 14 can control the disconnection or connection after receiving a command from a central control station through a network.

Although the apparatus and the method for variable disconnection control in a large battery system according to the present disclosure have been described herein with reference to the foregoing embodiments and accompanying drawings, they are not limited to the embodiments and drawings. Those skilled in the art will appreciate that various changes and modifications can be made within the technical spirit of the present disclosure and the scope of the appended claims and their equivalents.

What is claimed is:

1. An apparatus for variably controlling the variable disconnection of physical connections between battery assembly units, the apparatus comprising:
   a sensor module placed at an outside of the battery assembly units to sense current situations of the outside and transmit the sensed current situation data;
   switches provided to interconnection lines between battery assembly units to electrically connect or disconnect the interconnection lines;
   a switch control module adapted to apply on/off signals to the switches; and
   a disconnection control module adapted to receive the current situation data from the sensor module, judge a dangerous situation of the received data, determine a disconnection level based on the judged situation so that the disconnection intervals of the battery assembly modules are shortened the more the disconnection level is determined as a dangerous situation, and control the switch control module based on the determined dangerous level to vary the position and number of the target switches to be opened or closed and the disconnection intervals.

2. The apparatus according to claim 1, wherein the battery assembly units are selected from battery cells adapted to receive and store external power and supply the stored power to the outside, battery modules corresponding to assemblies of a plurality of battery cells, battery packs corresponding to assemblies of a plurality of battery modules, battery systems corresponding to assemblies of a plurality of battery packs, battery plants corresponding to assemblies of a plurality of battery systems, and combinations thereof.

3. The apparatus according to claim 1, wherein the sensor module senses dangerous situations comprising one of temperature, humidity, electrical short, flood and earthquake, and wiredly or wirelessly transmits information about the sensed dangerous situations to the disconnection control module.

4. The apparatus according to claim 1, wherein the disconnection control module outputs variable disconnection or connection control signals to the switch control module, and the control signals comprise identification information about at least one target switch to be opened or closed.

5. The apparatus according to claim 1, wherein the disconnection control module receives a manual command from a manager or a command from an external network and transmits a connection or disconnection command corresponding to the received command to the switch control module.

6. The apparatus according to claim 5, wherein the disconnection control module includes at least one function selected from if the disconnection control module is connected to an input/output interface connected to screen output means and data input means, a function of receiving a manager's manual input from the data input means through the input/output interface and transmitting a connection and disconnection command corresponding to the manager's manual input to the switch control module; and
   a function of receiving a connection or disconnection command from a central control station through communication means, to which the disconnection control module is connected, in a wired or wireless manner and transmitting the received command to the switch control module.

7. The apparatus according to claim 6, wherein the disconnection control module sends:
- if a flood is sensed, a command to disconnect battery cells in order to prevent electric shock;
- if a dangerous situation is sensed but there is no problem in power supply, a command to disconnect some parallel connections in order to sequentially replace with and connect to disconnected battery constituent modules;
- if a worker enters a battery system to maintain or repair the battery constituent modules, a command to disconnect interconnection lines to reduce the voltage of the battery system to a level equal to or lower than an allowable voltage for worker's safety by a manager's manual input;
- if sensed data for gate opening is received from the sensor module in association with a gate of a battery system structure, a command to automatically disconnect interconnection lines to reduce the voltage of the battery system to a level equal to or lower than an allowable voltage for worker's safety; or
- a command to disconnect some parallel connections in order to utilize the disconnected battery units as spare batteries in a battery system.

8. A battery assembly comprising:
- a variable disconnection control apparatus;
- battery assembly units; and
- a sensor placed at an outside of the battery assembly units,
wherein the variable disconnection control apparatus:
- receives sensed current situation data about current situations of an outside from the sensor placed at an outside of the battery assembly units,
- judges a dangerous situation of the received data,
- determines a disconnection level based on the judged situation so that the disconnection intervals of the battery assembly modules are shortened the more the disconnection level is determined as a dangerous situation, and
- controls the variable disconnection of the battery assembly units or any combination of the battery assembly units based on the determined dangerous level.

9. A method for variably controlling the disconnection of physical connections between battery assembly units by using a variable disconnection control apparatus, the method comprising:
- (S11) sensing, by a sensor module of the apparatus, a current situation at an outside of the battery assembly units and transmitting data about the sensed situation to the disconnection control module;
- (S12) receiving, by a disconnection control module of the apparatus, the current situation data from the sensor module, judging a dangerous situation based on the received data, and determining a disconnection level based on the judged situation wherein the disconnection intervals of the battery assembly modules are shortened the more the disconnection level is determined as a dangerous situation;
- (S13) transmitting, by the disconnection control module, a disconnection command to a switch control module if the determined disconnection level indicates disconnection of the previously connected switch control module;
- (S14) receiving, by the switch control module, the disconnection command and disconnecting physical connections of target switches;
- (S15) transmitting, by the disconnection control module, a connection command to the switch control module if the determined disconnection level indicates connection of the previously disconnected switch control module, after operation (S12); and
- (S16) receiving, by the switch control module, the connection command and connecting physical connections of the target switches.

10. The method according to claim 9, wherein the battery assembly units are selected from battery cells adapted to receive and store external power and supply the stored power to the outside, battery modules corresponding to assemblies of a plurality of battery cells, battery packs corresponding to assemblies of a plurality of battery modules, battery systems corresponding to assemblies of a plurality of battery packs, battery plants corresponding to assemblies of a plurality of battery systems, and combinations thereof.

11. The method according to claim 9, wherein the sensor module senses dangerous situations comprising one of temperature, humidity, electrical short, flood and earthquake, and wiredly or wirelessly transmits information about the sensed dangerous situations to the disconnection control module.

12. The method according to claim 9, wherein the disconnection control module outputs variable disconnection or connection control signals to the switch control module, and the control signals comprise identification information about at least one target switch to be opened or closed.

13. The method according to claim 9, wherein the disconnection control module receives a manual command from a manager or a command from an external network and transmits a connection or disconnection command corresponding to the received command to the switch control module.

14. The method according to claim 13, wherein the disconnection control module includes at least one function selected from: if the disconnection control module is connected to an input/output interface connected to screen output means and data input means, a function of receiving a manager's manual input from the data input means through the input/output interface and transmitting a connection and disconnection command corresponding to the manager's manual input to the switch control module; and
- a function of receiving a connection or disconnection command from a central control station through communication means, to which the disconnection control module is connected, in a wired or wireless manner and transmitting the received command to the switch control module.

15. The method according to claim 14, wherein the disconnection control module sends: if a flood is sensed, a command to disconnect battery cells in order to prevent electric shock;
- if a dangerous situation is sensed but there is no problem in power supply, a command to disconnect some parallel connections in order to sequentially replace with and connect to disconnected battery constituent modules;
- if a worker enters a battery system to maintain or repair the battery constituent modules, a command to disconnect interconnection lines to reduce the voltage of the battery system to a level equal to or lower than an allowable voltage for worker's safety by a manager's manual input;
- if sensed data for gate opening is received from the sensor module in association with a gate of a battery system structure, a command to automatically disconnect interconnection lines to reduce the voltage of the battery system to a level equal to or lower than an allowable voltage for worker's safety; or
- a command to disconnect some parallel connections in order to utilize the disconnected battery units as spare batteries in a battery system.

16. The method according to claim 9, wherein the apparatus variably controls the disconnection of the battery assembly units and any combination of the battery assembly units.

17. The method according to claim 10, wherein the apparatus variably controls the disconnection of the battery assembly units and any combination of the battery assembly units.

* * * * *